Figure 1:
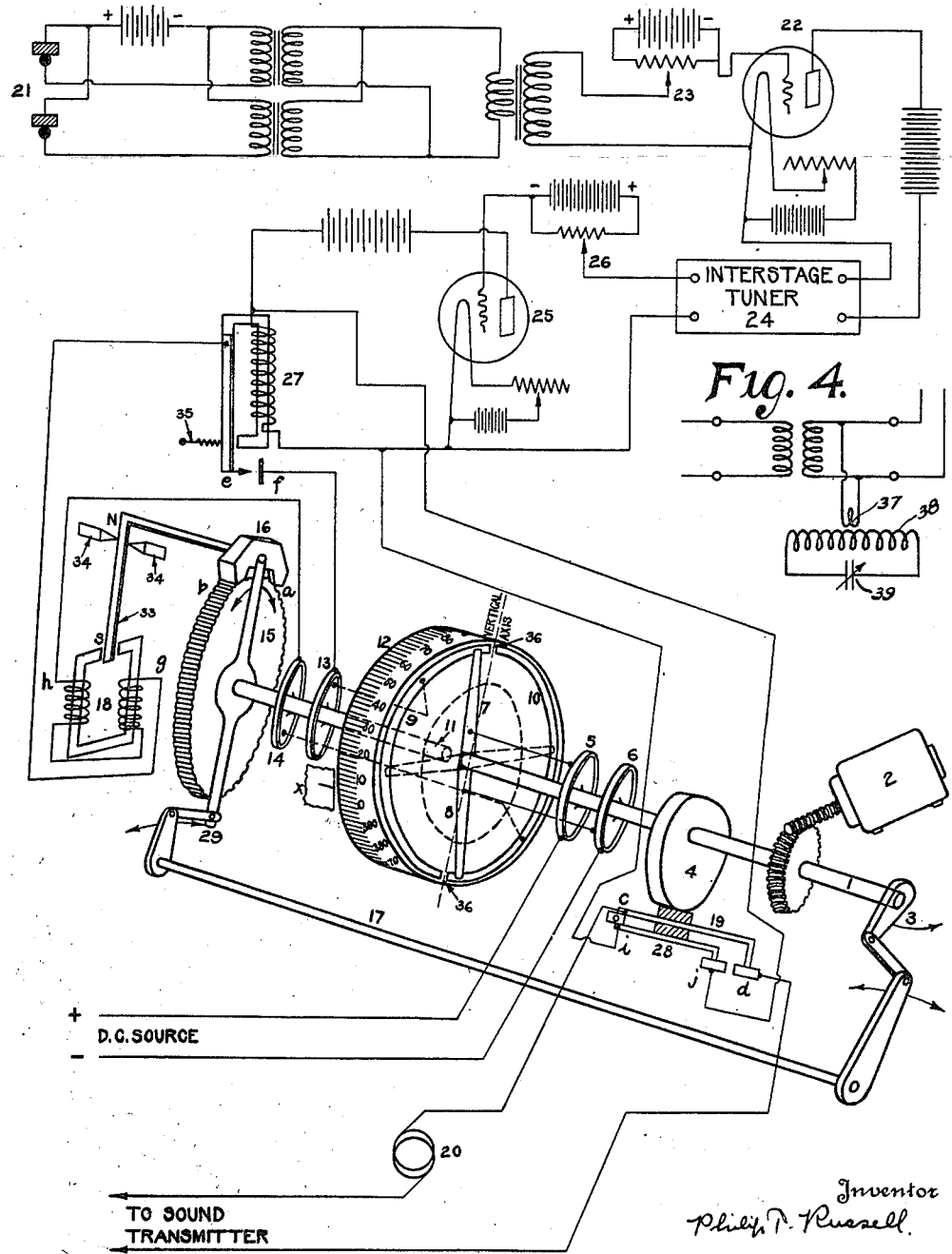

Patented Feb. 25, 1930

1,748,797

UNITED STATES PATENT OFFICE

PHILIP T. RUSSELL, OF MOUNT RAINIER, MARYLAND

APPARATUS FOR MEASURING DISTANCES

Application filed January 23, 1926. Serial No. 83,392.

(GRANTED UNDER THE ACT OF MARCH 3, 1883, AS AMENDED APRIL 30, 1928; 370 O. G. 757)

My invention relates broadly to a means for determining, indicating, and recording the depth of water beneath a floating body such as a ship and also the distance between an operator of a device of my invention and a distant fixed point or surface. My device is applicable alike to great and shallow depths and accordingly has utility for ascertaining accurate chart data regarding to topography of the ocean's bottom and is useful as a protective apparatus on shipboard for locating shallow water, shoals and ledges etc. The measuring instrument to be described may be operated not only on the familiar sound-echo principle, i. e. by obtaining a measure of the time interval between the transmission of a signal and receipt of its echo but it also has marked utility in the circumstances where reflection of sound waves is not available.

The primary object of my invention is to provide a visual means for ascertaining distance.

A further object is to cause a dial, indicating distances, to move to its final indicating position in a rapid and positive manner.

Another object is to provide for echo impulse amplification and selection.

A still further object is to permit a movement of the distance indicating dial that will instantly and accurately follow successive changes in the height of subaqueous terrain.

With the above and other objects in view, the invention consists in the construction, combination, and arrangements of parts as will be hereinafter more fully described.

Reference is to be had to the accompanying drawings forming part of this specification in which like reference characters indicate corresponding parts throughout the several views and in which:—

Figure 2:
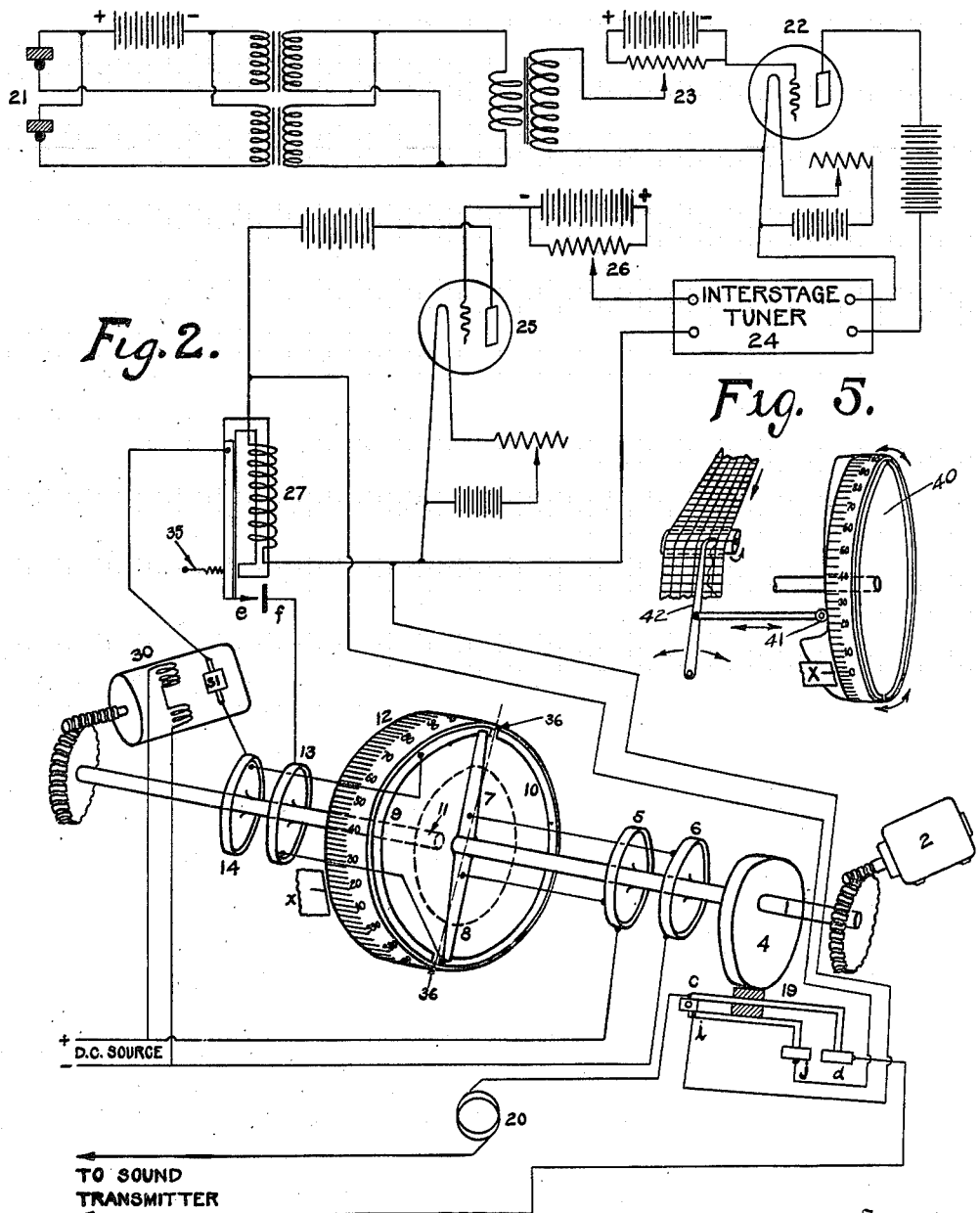
Figure 3:
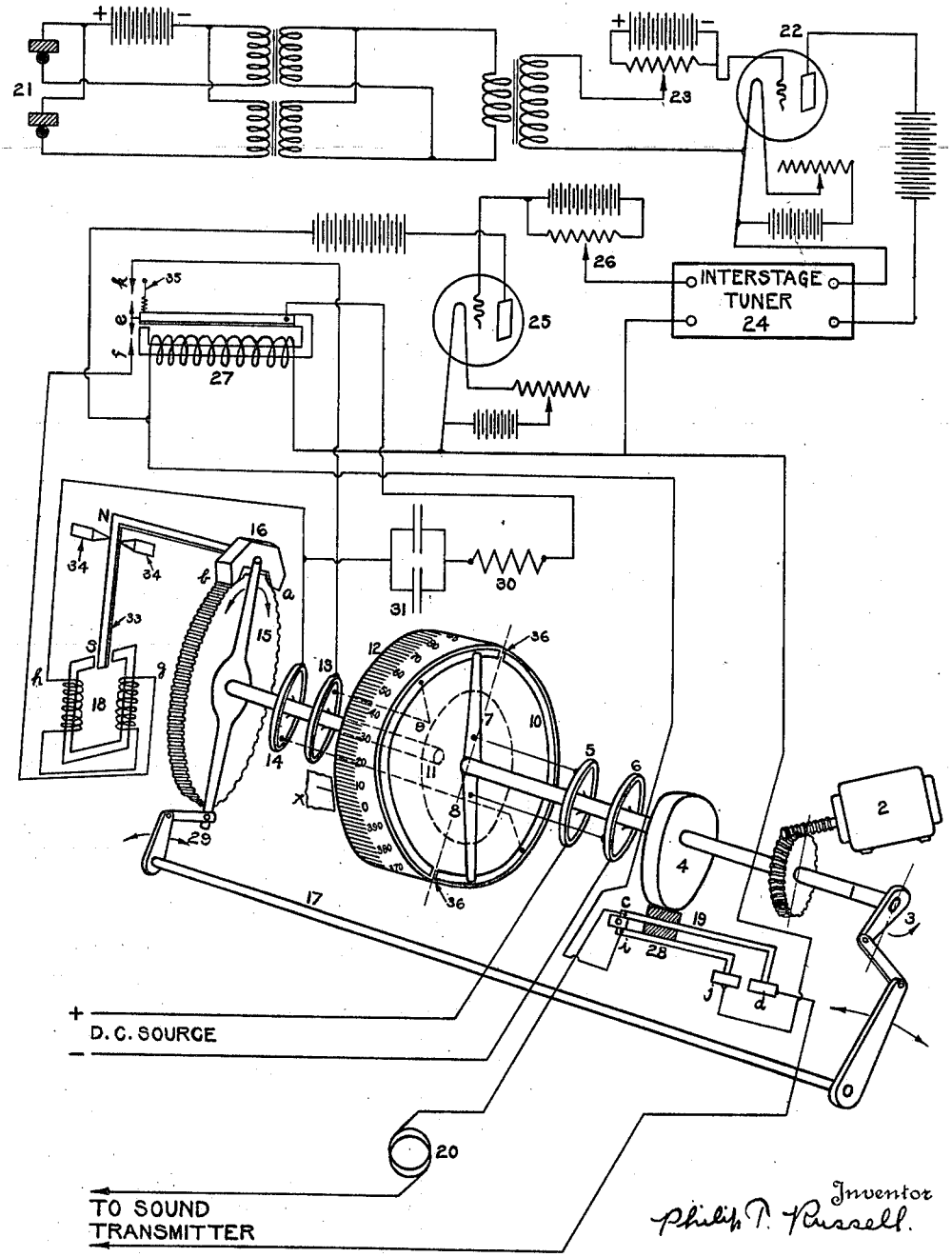

Figure 1 is a schematic diagram showing the manner of controlling the visual indicator by a relay equipped with a magnetic armature, Figure 2 shows a modified arrangement utilizing a motor for rotating the indicating dial, in place of a relay, Figure 3 is a further modification in which I provide condensers and additional apparatus to cause operation of the indicator, Figure 4 illustrates a preferred form of tuner used in receiving the echoes, and Figure 5 indicates a recording arrangement for use with my type of depth finder.

Referring more particularly to Figure 1, numeral 1 indicates a shaft that is driven at a constant known speed by a motor 2 and on which is mounted a crank 3, cam 4, insulated rings 5 and 6 and brushes 7 and 8, that in rotating make contact with segments 9 and 10 carried by a dial wheel 12, the portions between segments being insulated by sectors 36. The insulated rings 5 and 6 are electrically connected with brushes 7 and 8 respectively and also with a source (not shown) of direct current. A second shaft 11, in longitudinal alignment with shaft 1, has mounted thereon dial wheel 12, insulated rings 13 and 14, and a ratchet wheel 15 that is caused to rotate by the action of pawl 16. Insulated rings 13 and 14 are electrically connected to segments 9 and 10 respectively, the circuit being continued through coils $h$ and $g$ of electromagnet 18 when contacts $e$ and $f$ are closed. The pawl 16 is pivotally mounted on rod 29 and is free to oscillate about shaft 11, the oscillatory movement being obtained through crank 3, bar 17 and such levers as may be necessary. At 21, I show a microphonic receiving device in electrical relation with a cascade amplifying system of the thermionic type, having for its load, coil 27. By legend, I have indicated a submarine signalling transmitter (not shown) which however may be of conventional design.

In order to facilitate the description of ascertaining distance according to my method and apparatus, I will assign a definite value for each variable involved.

Assume that the depth of water at a particular location is 600 feet. Since a sound impulse including the echo in case it is reflected, travels through water at the approximate rate of 4800 feet per second, the time interval of one fourth of a second between primary impulse and echo becomes a direct measure of the distance travelled by the pressure wave. The principle involved needs no elaboration as it is obviously elemental. Let us now assume that shaft 1 in Figure 1 rotates at the rate of 60 revolutions per minute, e. g. one revolution per second, and that alternator 20 produces a frequency of 540 cycles per second. It will be seen from the position of cam 4 that the closing of signal impulse contacts 19 and *d*, takes place when brush 7 is in a vertical position. At the time an echo is received, one quarter of a second later under the values set, the brush will have moved to a horizontal position shown in dotted line, pointing toward the reader (assuming a counter-clockwise rotation of shaft 1). At the time brush 7 takes up this new position on its circulatory path, sensitive relay 27 becomes energized, due to the amplified electrical impulses initiated by receipt of the echo in receiving devices 21. The energization of this relay causes contacts *e—f* to close the circuit from the direct current source through windings *h* and *g*.

The last stated windings cause permanent magnet 33 to swing about pivot 34 compelling surface *b* of pawl 16 which is given an oscillatory movement by members 3, 17 and 29 to intermesh with ratchet wheel 15, turning the latter counter clockwise, the angular displacement depending upon the adjustment of that portion of the linkage indicated at 29. Inasmuch as the alternator has sent out a series of impulses having a group frequency of one per second, the echoed waves will be represented by a current in coils *h* and *g* of a more or less constant amplitude, rising sharply at the beginning of the first echo impulse and dropping at the end of the echo group. Thus, pawl 16 will bear down on ratchet wheel 15, turning it intermittently until a position of the latter is reached which is commensurate with the angular motion described by brush 7 during the time interval between an impulse and the echo corresponding thereto. It is obvious that if the oscillatory linkage were such as to give pawl 16 an angular velocity comparable with that of brush 7, then the ratchet-wheel will have moved through a ninety degree displacement, turning dial 12 the same amount. In case the velocity is not sufficient to cause the pawl to turn dial 12 one quarter of a complete revolution, the latter will rotate a definite amount less than the quarter and there remain motionless until the next echo train arrives since between echoes contacts *e* and *f* are automatically opened. Upon receipt of the next wave actuating relay 27, brush 7 will have attained a position ninety degrees from its vertical axis as before, causing pawl 16 to remain depressed to rotate wheel 15 an additional amount. Upon the arrival of sufficient echo waves, the number of which may be regulated in a manner to be hereinafter described, the ratchet wheel will reach its final position to indicate the assumed depth, i. e. shall have turned ninety degrees.

It has been found however, that owing to the magnetic retentivity of electromagnet 18, permanent magnet 33 will remain in its attracted position for a moment or so after the termination of an echo impulse and will cause surface *b* to turn dial 12 one step beyond ninety degrees required for the assumed conditions of a depth of 600 feet and shaft rotating at 60 revolutions per minute. In order to return the dial to its proper position as rapidly as possible, I provide a simple expedient which is described hereinafter. At the instant the dial will have overrun the ninety degree mark, brush 7 will start to make contact with segment 10 simultaneously with the impingement of echoes on the microphone receivers. By following the resulting circuit beginning with the direct source, it will appear that coils *g* and *h* are now energized in a reverse direction than heretofore, thus pulling surface *a* of the pawl downward to turn the ratchet wheel in a clockwise direction. Furthermore, it is apparent that this operation will continue until the position of brush 7 and insulated sector 36 coincide, at the position of quadrature when the echo is received. If by chance the dial should overrun while turning clockwise, brush 7 will start to contact with segment 9 at the time of echo arrival as first described, the resulting effect being merely to turn the dial counter clockwise as formerly. In any case, however, the final position taken by the indicator, which for the specific values given was assumed to be a quarter of a complete revolution, will be an accurate measure of the time elapsing between the initiation of a sound wave train and the echo resulting therefrom.

Obviously linkage member 29 may be adjusted to cause the dial to rotate any number of degrees during a definite time interval. It will be further noted that if the distances or depths are so great as to require a time interval of exactly one second, the dial will oscillate slightly from one side to the other side of the position in which the insulated portions between the segments 9 and 10 are in a vertical position, designated in Figure 1 as the vertical axis, until the final position that the dial assumes is that in which the insulated segments coincide with the vertical axis in which position the dial registers zero. The indicator would also remain in the latter position when the lapsed time is exactly two seconds or any other multiple of one second. When the dial assumes the zero position it indicates that the interval between the transmission of the signal and the reception of its echo is one second or a multiple thereof, in which case the operator must determine from available maps or other extraneous date, which of the multiples was applicable to the specific case or, if these are not available, he must vary the interval between the transmission of the signals and compute the multiple from the change indicated by the dial. When the exact multiple of the interval between signals has been determined, the interval is again set at one second and the dial then indicates the depth beyond the depth corresponding to the exact multiple referred to herein.

However, conditions involving a time interval of one second or more arise only infrequently, as my depth finder is intended to be used on ships as a protective device for locating shoals, channels, etc. when the time intervals are of relatively short duration.

In measuring distances between my device and a reflecting surface, both above the water line, the interval may be between one and two seconds, in which case the dial would take up a position representative of the difference between the actual time interval and one second of elapsed time. From an inspection of the disclosure, it is apparent, that in case my apparatus is utilized exclusively for long distance determinations, i. e. in which the time interval exceeds one second, the speed of the rotating linkage may be reduced by means of a gear shift or any other suitable means whereby the depth readings may be indicated upon another scale on the same dial. The different scales are calibrated for the different speeds of the rotating linkage so that for any predetermined speed the different scales will give a direct reading of the depth to be meausred.

It will be understood therefore, that by calibrating the dial into convenient units in the form of a scale such as feet, yards or fathoms, which calibration is obtained initially by experiment either in known depths or as measured along known distances, I am able to instantly determine and automatically record by obvious means the distance traversed by a pressure wave through a medium of a substantially homogeneous and ponderable nature, as water and air.

I have indicated receiving devices 21 as that of the microphone type but it is obvious that any other form of sound receptive means may be employed. I have further shown devices 21 as connected to a common battery and to two primary and secondary windings effectively in parallel. The parallel arrangement of microphones provides a sensitive control of an electrical power by weak incoming signals to a much greater degree than is possible with a single device. Furthermore, a plurality of receiving units is essential for distribution throughout the ship's underwater surface. I separate the secondary winding into as many sections as there are microphones, thus providing an efficient transformer ratio in case certain of the receivers either fail to respond entirely or perhaps do respond but in an unequal manner.

In regard to the bias on each grid, I have found that many of the undesirable noises originating on a ship from machinery etc., have an intensity less than that of the incoming signal, particularly if the latter is reflected from a nearby surface and hence by providing a high negative bias which normally paralyzes the tube, the echo will cause an electrical response sufficient to overcome the effect of paralyzation while the undesirable impulse will fail to so do. The feature just described is obviously additional to that of conserving plate battery current and that of gaining maximum amplification by causing the thermionic devices to operate on the straight portion of their grid voltage plate current characteristic curve. I therefore utilize two means for separating the desired from the undesired impulses namely, the high negative grid bias functioning by intensity discrimination and a filter between one or more stages operating on a frequency selection basis. The filter is constructed in accordance with any well known method and is adjusted to the frequency of the sound waves used in the system whereby currents differing in frequency from the transmitted frequency are by-passed and filtered out of the amplified signals.

In Figure 1, I have also illustrated contacts 28 and $j$ which close simultaneously with the adjacent contacts 19 and $d$ under the action of cam 4. A closure of 28 and $j$ in effect short circuits coil 27 rendering it inoperative at the instant a signal impulse is transmitted. This added feature obviously prevents the coil from responding electrically to the reception of a signal which has failed to travel the entire path, the length of which path is to be measured.

The operation of the apparatus illustrated in Figure 2 is practically similar to that of Figure 1 except that a motor 30 of the shunt wound type is provided to rotate in lieu of the linkage system. When contacts $e$ and $f$ are closed the circuit including the armature 31 is completed causing the motor to revolve in such a direction as will depend upon which of the two segments 9 and 10 that brush 7 is passing over at a given instant of time. The current through the armature will reverse under the same conditions as noted in regard to Figure 1, thus compelling dial 12 to take up a final position indicative of the signal-echo time interval.

Figure 3 represents a preferred embodiment of my invention. As in Figure 1, I utilize an electromagnetic mechanism for controlling the oscillatory motion of pawl 16 but in addition I provide an energy storing means to operate in conjunction therewith. As brush 7 upon revolving makes contact alternately with segments 9 and 10, condensers 31 first charge in one direction and then in the other, the circuit at a particular instant being traced from the positive terminal of the direct current source, to ring 5, brush 7, segment 9, ring 13, contacts $e$, $k$ (normally kept closed by tension spring 35), through armature 36 to the right hand plate of the condensers. The remaining condenser plate obtains its charge of opposite polarity through ring 14, segment 10, brush 8, ring 6, back to the negative side of the current source. Resistance 30 is inserted in the series with the condensers as a protective means to prevent potential surges occasioned by the voltage self-induced in coils $h$ and $g$ from puncturing the condenser insulation at the time contacts $e$ and $f$ are broken. Under the values assumed when explaining Figure 1, brush 7 will again occupy a position ninety degrees removed from the vertical axis at the time the echo is received, the right-hand plate of condenser 31 having attained a positive charge and the opposite plate being charged negatively. Moreover, upon receipt of the returned impulse coil 27 will be energized, closing $e$ and $f$ and permitting condensers 31 to discharge through coils $h$ and $g$ which in turn cause pawl 16 to rotate dial 12 intermittently a distance commensurate with the signal-echo time interval in precisely the same manner as described with regard to Figure 1. Should the dial overrun its final stationary position, brush 7 will connect with segment 10 at the time of echo arrival because upper insulated sector 36 will have moved through an angle of more than ninety degrees. Condensers 31, therefore, will charge in the opposite sense than formerly and when contacts $e$ and $f$ are again closed by the energization of coil 27, upon receipt of a succeeding echo train, coils $g$ and $h$ will cause the pawl to operate in a reverse manner, turning the dial clockwise until sector 36 is stationary, exactly at the ninety degree mark. The value of condenser 31 and resistance 30 depend upon the size and requirements of the individual installation but I have successfully used two condensers in parallel, each of four microfarads and a resistance of one hundred ohms in series therewith.

It is obvious that more or less than two condensers may be used, and under certain conditions of operation resistance 30 may be dispensed with. In this figure, it is to be noted that the leading current characteristic of the condenser will offset to a marked degree the current retarding effect of inductances $h$ and $g$ hence permit a substantially instantaneous rush of current through the coils when rapid response is imperative.

In Figure 4, I show a special form of tuner, which consists of a low impedance coil 37 of a few turns connected in shunt to the main circuit and in inductive relation to a secondary winding 38 of a relatively large number of turns. An adjustable condenser 39 is placed across the terminals of the secondary coil as shown. By changing the value of the condenser until the tuner resonates with the frequency of the desired wave, it is apparent that a maximum transfer of signal energy takes place across the main transformer. However, while I prefer this type of tuner, it is obvious that other forms may be utilized to advantage and in case extreme selectivity is required, a tuner should be inserted between all stages of the cascade amplifying system.

In Figure 5, I disclose a preferred form of recorder. It consists essentially of a dial 40, one edge of which is cam shaped, to provide an operating surface for roller 41. The reciprocating motion of the bar attached to the roller causes pen 42 to draw a curve graphically, the ordinates of which represent distance if sound travel and the abscissa, being spaced in equal intervals of time.

While I have explained the operation of my device upon a sound reflection or echo basis, it is readily seen that under certain conditions, transmitters 21 may be located near the distant object, and depend for their actuation upon direct signal impulses emitted by the sound transmitter. Such an operation would require a mere extension of the electrical receiving circuit together with additional amplifiers, if necessary. Dependent upon circumstances the circuit may comprise a direct wire connection as explained above or the path from microphone to sensitive relay may be linked by wireless or by a system combining wire and wireless sections.

It will be understood that many modifications may be made both in the apparatus and in the circuit arrangements herein described, and therefore I do not desire to be limited to the exact apparatus and systems which I have illustrated for the purpose of disclosing my invention.

The invention herein described may be manufactured and used by or for the Government of the United States for governmental purposes without the payment to me of any royalty thereon or therefor.

I claim:

1. In a distance measuring device including a sonic transmitter and a sonic receiver, the combination of a shaft, means for rotating the shaft at a constant speed, means upon the shaft and rotatable therewith for activating the sonic transmitter at predetermined intervals, brushes upon the shaft, a second shaft, a commutator dial upon the second shaft and engaging the brushes on the first shaft, and means activated by the sonic receiver for rotating the commutator dial to a definite angular position with respect to the instantaneous position of the brushes, the angular position of the commutator dial indicating the interval of time required for the sound to travel from the sonic transmitter to the sonic receiver.

2. In a distance measuring device including a sonic transmitter and a sonic receiver, the combination of a shaft, means for rotating the shaft at a constant speed, means for activating the sonic transmitter at predetermined positions of the shaft, brushes upon the shaft and rotatable therewith, a second shaft, a commutator dial upon the second shaft and engaging the brushes upon the first mentioned shaft and means activated by the sonic receiver for maintaining the commutator dial at a fixed angular position relative to the brushes at the time of activation of the sonic transmitter, said angular position of the commutator dial indicating the interval of time required for the travel of a sonic signal from the sonic transmitter to the sonic receiver.

3. In a distance measuring device including a sonic transmitter and a sonic receiver, the combination of a shaft, means for rotating the shaft at a constant speed, means for activating the sonic transmitter at predetermined positions of the shaft, brushes upon the shaft and rotatable therewith, a second shaft, a commutator dial upon the second shaft and engaging the brushes upon the first mentioned shaft, and means activated by the sonic receiver for maintaining the commutator dial at a fixed angular position relative to the brushes at the time of activation of the sonic transmitter, said means consisting of a ratchet wheel upon the second mentioned shaft, a pawl engaging the ratchet wheel, and means engaging the pawl and the first mentioned shaft for driving the pawl, said angular position of the commutator dial indicating the interval of time required for the travel of a sonic signal from the sonic transmitter to the sonic receiver.

4. In a distance measuring device including a sonic transmitter and a sonic receiver, the combination of a shaft, means for rotating the shaft at a constant speed, means for activating the sonic transmitter at predetermined positions of the shaft, brushes upon the shaft and rotatable therewith, a second shaft, a commutator dial upon the second shaft and engaging the brushes upon the first mentioned shaft and means activated by the sonic receiver for maintaining the commutator dial at a fixed angular position relative to the brushes at the time of activation of the sonic transmitter, said means consisting of a ratchet wheel upon the second mentioned shaft, a pawl engaging the ratchet wheel, means engaging the pawl and the first mentioned shaft for driving the pawl and means for reversing the engagement of the pawl with the ratchet wheel, said angular position of the commutator dial indicating the interval of time required for the travel of a sonic signal from the sonic transmitter to the sonic receiver.

5. In a distance measuring device including a sonic transmitter and a sonic receiver, the combination of a shaft, means for rotating the shaft at a constant speed, means for activating the sonic transmitter at predetermined positions of the shaft, brushes upon the shaft and rotatable therewith, a second shaft, a commutator dial upon the second shaft and engaging the brushes upon the first mentioned shaft and means activated by the sonic receiver for maintaining the commutator dial at a fixed angular position relative to the brushes at the time of activation of the sonic transmitter, said means consisting of a ratchet wheel upon the second mentioned shaft, a pawl engaging the ratchet wheel, means engaging the pawl and first mentioned shaft for driving the pawl and means for reversing the engagement of the pawl with the ratchet wheel, said means consisting of an armature electrically operated by the sonic receiver, said angular position of the commutator dial indicating the interval of time required for the travel of a sonic signal from the sonic transmitter to the sonic receiver.

6. In a distance measuring device including a sonic transmitter and a sonic receiver, the combination of a shaft, means for rotating the shaft at a constant speed, means for activating the sonic transmitter at predetermined positions of the shaft, brushes upon the shaft and rotatable therewith, a second shaft, a commutator dial upon the second shaft and engaging the brushes upon the first shaft and means activated by the sonic receiver for maintaining the commutator dial at a fixed angular position relative to the brushes at the time of activation of the sonic transmitter, said means consisting of a ratchet wheel upon the second mentioned shaft, a pawl engaging the ratchet wheel, means engaging the pawl and the first mentioned shaft for driving the pawl and means for reversing the engagement of the pawl with the ratchet wheel, said reversing means consisting of an armature, a relay, a plurality of condensers in series with the contacts of said relay and said armature, the coil of said relay activated by the sonic receiver, said angular position of the commutator dial indicating position of time required for the travel of the sonic signal from the transmitter to the object, the distance of which from the transmitter is desired and the echo to return therefrom to the receiver.

7. A time or depth determining apparatus comprising in combination a registering dial, mechanism for transmitting sound signals, means controlling said sound transmitting mechanism, means for receiving sound signals, an armature, means electrically coupling said signal receiving means to said armature and adapted to actuate the armature, a condenser electrically connected to said armature, a source of direct current, means rotatively operated by said control mechanism for intermittently connecting said condenser in series with said source of current and with said armature, means energized upon actuation of said armature for controlling the direction of rotation of the dial through an angle commensurate with the depth to be determined and means connected with said controlling means of said transmitting mechanism for rotating said dial while a signal is being received.

8. Apparatus for indicating the time intervals between the transmission and receipt of sound through a medium or a function of said time intervals comprising a continuously rotated element, means actuated thereby for periodically transmitting a signal, a control mechanism for said transmitting means, means for receiving said signal, a second rotatable element, a source of direct current, reversing contact means for said direct current between said first element and said second element and means actuated by said control mechanism for rotating said second element in one direction or the other depending on the relative position of said contact means between the two elements at the time the signal is received.

9. In an apparatus for measuring depth, comprising a sound transmitter, means controlling said transmitter, a rotative element connected with said controlling means, a sound receiver, a second rotative element, means adapted to actuate said second element by said controlling means and first rotative element, a source of direct current, reversing contact means between said first and said second elements, a condenser alternately charged and discharged by said reversing contact, an indicator and means for turning said indicator at an angle to measure depth when said condenser is discharged.

10. In an apparatus for measuring depth, comprising a sound transmitter, means controlling said transmitter, a rotative element connected with said controlling means, a sound receiver, a second rotative element, means adapted to actuate said second element by said controlling means and first rotative element, a source of direct current, a condenser, a reversing contact, means between said first and second element for alternately admitting a positive and negative charge into said condenser, an indicator attached to said second element, and means controlled by said condenser to rotate said second element in either direction depending upon the sign of the charge discharged from said condenser whereby depth is registered on said indicator.

11. In a distance measuring device comprising a sound transmitter, a constantly rotating mechanism, means connected with said rotating mechanism for controlling said transmitter, a condenser, a source of direct current, means operated by said rotating mechanism to intermittently connect said condenser in series with said current, an armature electrically connected with said condenser, a sound receiving means for actuating said armature, a registering dial and means for actuating said dial through an angle commensurate with the depth to be measured upon the discharge of said condenser.

12. In a distance measuring device including a sound transmitter and a sound receiver, the combination of a plurality of brushes, means for rotating the brushes at a constant speed, means for activating the transmitter at predetermined positions of the brushes, a commutator dial having segments thereon engaging the brushes, an armature, a condenser electrically connected to said armature and in series therewith, a relay in series with said condenser, means for charging the condenser of different polarities depending upon the relation of the brushes with the dial segments, a sound receiving means actuating said armature whereby said dial is actuated through an angle commensurate with the depth to be measured, and means holding said commutator dial in a fixed angular relation to said brushes during activation of the transmitter.

PHILIP T. RUSSELL.